May 12, 1959

G. F. HORTON 2,886,058

HIGH PRESSURE CHECK VALVE

Filed Oct. 6, 1954

INVENTOR
Gilmer F. Horton.
BY
Gustave Miller
ATTORNEY

May 12, 1959  G. F. HORTON  2,886,058
HIGH PRESSURE CHECK VALVE
Filed Oct. 6, 1954  2 Sheets-Sheet 2
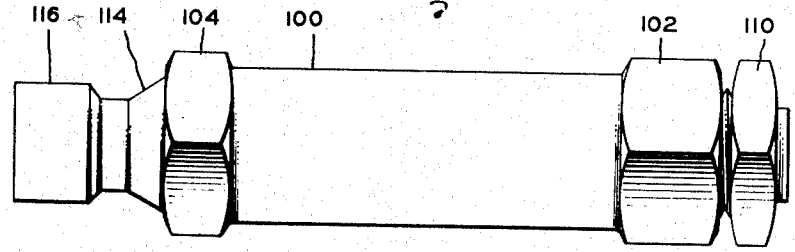
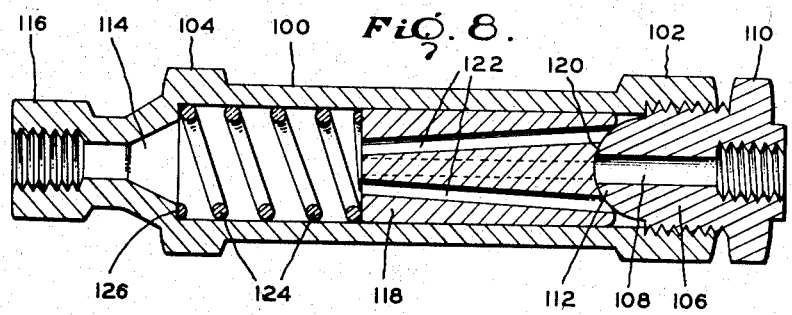
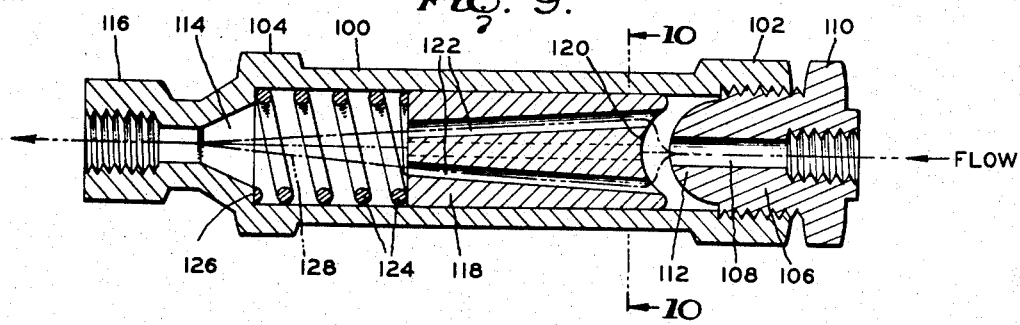
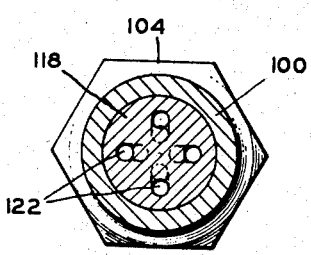
INVENTOR
Gilmer F. Horton.
BY
Gustave Miller,
ATTORNEY United States Patent Office 2,886,058
Patented May 12, 1959

2,886,058
HIGH PRESSURE CHECK VALVE
Gilmer F. Horton, Mount Airy, N.C.

Application October 6, 1954, Serial No. 460,652

6 Claims. (Cl. 137—484.2)

This invention relates to check valves and particularly relates to check valves which are adapted to be used in high pressure lines and in heavy machinery such as in the hydraulic or pneumatic system of aircraft, ships or the like.

One object of this invention is to provide a check valve wherein the flow therethrough from the inlet end is effected in a generally streamlined path, resulting in less pressure drop and less resistance to flow.

Another object of this invention is to provide a check valve wherein there is a smooth, easy opening of the valve and a quick, positive closing thereof.

Another object of this invention is to provide a check valve wherein there is provided a streamlined, tapered flow from the inlet to the outlet end of the valve with a concentration of the fluid flow at central portion of the valve adjacent the outlet end so as to provide the greatest efficiency of flow.

Other objects of this invention are to provide an improved check valve device of the character described, that is easily and economically produced, which is sturdy in construction, and which is highly efficient in operation.

With the above and related objects in view, this invention consists in the details of construction and combination of parts, as well be more fully understood from the following description when read in conjunction with the accompanying drawings in which:

Fig. 7 is a side elevational view of a second embodiment of the invention.

Fig. 8 is a side sectional view of the device of Fig. 7, showing the valve in closed position against the valve seat.

Fig. 9 is a view similar to Fig. 8 but showing the valve in open position.

Fig. 10 is a cross-sectional view taken on line 10—10 of Fig. 9.

Figure 1:
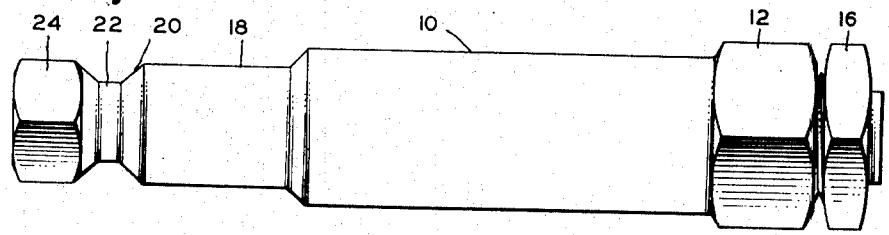
Fig. 1 is a side elevational view of one embodiment of the present invention.

Referring now in greater detail to the drawings wherein similar reference characters refer to similar parts, there is shown a valve housing 10 which is in the form of an elongated cylinder having an integrally connected collar 12 at one end, the outer periphery of the collar being polygonal in shape to enable it to be grasped by a wrench or the like. The internal wall of the collar 12 of the housing is screw-threaded to threadedly receive the external threads of a bushing 14 having a central passage 15. The bushing is internally threaded and is also provided with an integrally formed polygonal collar 16. At the opposite end of the housing 10 is provided a cylindrical portion 18 of reduced diameter relative to the main portion of the housing. At the end, which is remote from the main portion of the housing, the cylindrical portion 18 is inwardly tapered as at 20 and is integral with a narrow throat portion 22. The throat 22 opens into an internally threaded polygonal nipple 24 which is adapted to be threadedly connected to a fluid system.

The bushing 14, which is adapted to be threadedly connected to a fluid line by means of its internally threaded portion, is also provided with a hemispherically concave end 26 which is adapted to serve as a valve seat for the valve piston 28. It should here be noted that the valve seat 26 is axially adjustable within the housing 10 by means of its threaded connection therewith.

Figure 2:
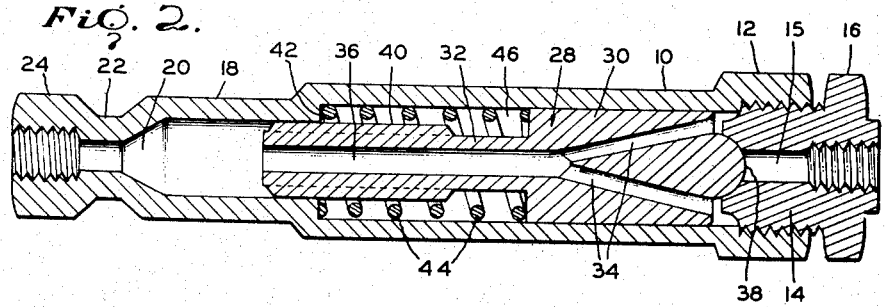
Fig. 2 is a side sectional view of the device of Fig. 1, showing the valve in closed position against the valve seat.
Figure 3:
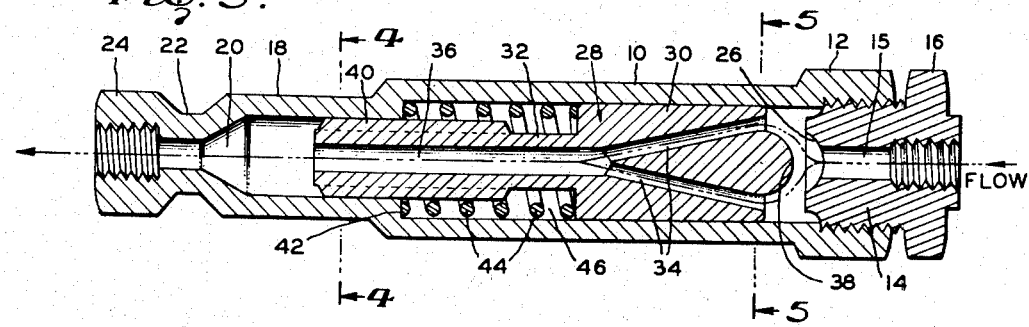
Fig. 3 is a view similar to Fig. 2 but showing the valve in open position.
Figures 4, 5, 6:
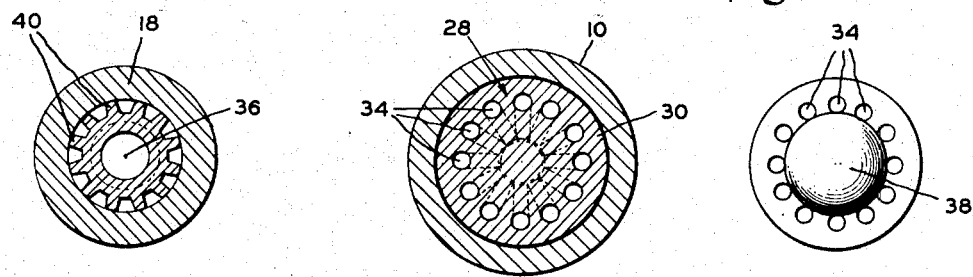
Fig. 4 is a cross-sectional view taken on line 4—4 of Fig. 3.
Fig. 5 is a cross-sectional view taken on line 5—5 of Fig. 3.
Fig. 6 is an end elevational view of the valve piston shown in Figs. 2 and 3.

The valve piston 28 comprises a cylindrical body 30 from which extends a tube 32. A plurality of drilled holes 34 have inlet openings which are circularly arranged at the front end of the body 30 and taper axially inwardly toward a central opening which coincides with the axial passage 36 of the tube 32, as best shown in Figs. 2 and 3. The circulary arranged holes at the front end of the body 30 surround a hemispherical knob 38 which forms the valve heat on the valve piston. This knob 38 is adapted to seat on the hemispherical seat 26 when the valve is in closed position.

At the rear end of the valve piston, the tube 32 is provided with an annularly arranged series of elongated splines 40 extending radially from the external wall of the tube. These splines 40 are adapted to slidably engage the internal wall of the constricted portion 18. Between the inner wall of the cylindrical body 30 and the shoulder 42, which is provided between the main portion of the housing and the constricted portion 18, is provided a coil spring 44 which encircles the tube 32 and is positioned in what is, in effect, an annular chamber 46.

In operation, when fluid under pressure flows through the passage 15, it impinges on valve head 38 and forces the piston 28 away from the valve seat 26. The fluid then flows around the valve head 38, whose hemispherical contour provides a streamlining effect, and through the passages 34. The passages 34, being long and narrow, provide a Venturi effect which increases the velocity of the fluid flowing therethrough. The separate streams then combine to form a single stream flowing through the tube 32. As the fluid flows from tube 32 through the streamlined outlet portion 20, it attains an increase of velocity due to the Venturi action of the passages 34 and 36. The high velocity of the fluid stream causes a partial vacuum to develop around the stream. This partial vacuum causes any fluid trapped in the annular chamber 46 to flow through the passages between the ribs 40. This outflow of the fluid from chamber 46 assists the opening movement of the valve. On the other hand, when the fluid flow is in the opposite direction, the fluid flows through the passages between the splines 40 and, by impinging on the rear face of the body 30, assists the spring 44 in closing the valve against the seat 26. The streamlined contours of the parts and the use of the annular chamber 46 to assist the movement of the valve in either direction provides a highly efficient balanced type check valve which is especially effective in the high pressure hydraulic and pneumatic systems used in aircraft.

In Figs. 7 to 10 there is illustrated a modified form of the invention which, having few parts and being simpler in construction than the first described embodiment, is easier and less expensive to manufacture and less liable to break down.

However, it is not quite as finely balanced as the first described embodiment. The mechanism embodying this second form of the invention comprises an elongated, cylindrical housing 100 provided at either end with an integral, polygonal collar as at 102 and 104. The collar 102 is provided with internal threads adapted to threadedly receive the externally threaded plug portion of a bushing 106 having a passage 108 and a polygonal collar 110. A convex, hemispherical valve seat 112 is formed at the internal end of the bushing 106. At the opposite end of the valve housing is provided a conical passage 114 which is connected to an internally threaded nipple 116. A cylindrical valve 118 is axially slidable in the housing 100.

A concave, hemispherical valve head 120 is provided on the valve 118, this valve head being adapted to seat on the valve seat 112. A plurality of drilled holes 122 extend axially of the valve 118 and taper inwardly toward the axis of the valve as they extend toward the rear of the valve. A coil spring 124 is positioned between the rear end of the valve 118 and the shoulder 126 formed adjacent the conical passage 114. This coil spring 124 acts to urge the valve toward closed position on seat 112 as shown in Fig. 8.

In operation, when fluid under pressure flows through passage 108, it impinges against the center of the valve head 120 and forces it from the valve seat against the force of spring 124. The fluid then flows around the concave valve head in a smooth, streamlined fashion and through the passages 122 which act as Venturi passages to increase the velocity of the fluid. The fluid then emerges from the separate passages 122 to form a conical stream as at 128, this stream passing through the center passage within the coil 124. The conical passage 114 reduces the pressure drop of the fluid stream as it flows through the outlet end of the valve housing. When the fluid flows in the opposite direction, it not only flows through the passages 122 but also impinges against the rear end of the valve. Since the solid portion of the rear end of the valve is greater in area than the openings 122, the pressure of the fluid against the solid portion, together with the spring 124, forces the valve back against the valve seat 112.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A check valve comprising a generally cylindrical counterbored valve housing forming a chamber, said chamber having an inlet end and an outlet end, said chamber having a large bore at said inlet end and a small bore at said outlet end, a hemispherical valve seat of substantial area at said inlet end of said chamber, a cylindrical valve piston axially slidably and cylindrically bearing within the large bore of said chamber to prevent passage of fluid thereby, said valve piston having a hemispherical valve head of substantial area complementary to said valve seat, a plurality of elongated passages extending axially of said valve piston, each of said elongated passages being inclined from a position adjacent said valve head toward the longitudinal axis of said valve piston, an elongated tube extending rearwardly from said valve piston and slidably and cylindrically bearing within said small bore of said chamber, each of said elongated inclined passages leading into the axial passage in said tube, an annular chamber surrounding said tube, said annular chamber being adapted to vary in size as said valve piston and tube move axially of said housing and elongated parallel passages connecting said annular chamber to said outlet end of said chamber.

2. The check valve of claim 1 wherein said tube is provided with a series of elongated splines annularly spaced from each other around the outer periphery of said tube, said splines being adapted to slidably contact the internal wall of said small bore portion and forming said elongated parallel passages therebetween.

3. The check valve of claim 1 wherein a spring is positioned in said annular chamber around said tube, biased between a shoulder in said chamber between said large and small bore portions and a shoulder between said valve piston and said extending elongated tube thereon, to urge said valve head toward said valve seat.

4. A check valve comprising a generally counterbored cylindrical valve housing having a shoulder between a large bore portion and a small bore portion of said counterbore, a hemispherical valve seat of substantial area having an inlet passage at the end of said large bore portion, an outlet passage at the end of the small bore portion, a generally cylindrical valve piston having a diameter at one end corresponding to the large bore of said cylindrical chamber and having a diameter at the other end corresponding to the small bore of said cylindrical chamber and having a shoulder between said two diametered ends, said valve piston having at its large end a hemispherical valve head of substantial area complementary to said valve seat, an axial passage extending through the end of said small diameter portion of said valve piston, a plurality of elongated passages extending from said axial passage at an incline thereto through the end of the large diameter portion of said valve piston about said hemispherical valve head, said large diameter portion of said valve piston being readily yet snugly slidable in said large bore portion of said housing, said small diameter portion of said piston having a plurality of elongated splines at its outer surface slidable along said small bore portion of said housing, whereby both ends of said valve piston have slidable bearing in said housing, said splines providing elongated passages therebetween extending from said small bore portion of said housing to a variable annular chamber provided between said shoulder of said counterbored housing and said shoulder on said valve piston providing ready entry and discharge of fluid to said variable annular chamber from said small bore portion only.

5. The check valve of claim 4, and a coil spring in said variable chamber biased between said valve piston shoulder and said housing shoulder urging said valve piston toward valve closing position.

6. The check valve of claim 4, said outlet passage having a diameter smaller than said small bore portion of said housing.

References Cited in the file of this patent

UNITED STATES PATENTS

| | | |
|---|---|---|
| 782,003 | Carlin | Feb. 7, 1905 |
| 1,627,312 | Blust | May 3, 1927 |
| 2,114,921 | Gessner | Apr. 19, 1938 |
| 2,439,117 | Waterman | Apr. 6, 1948 |
| 2,449,119 | Holicer | Sept. 14, 1948 |
| 2,601,654 | Wright | June 24, 1952 |
| 2,664,106 | Livers | Dec. 29, 1953 |
| 2,675,021 | Allin | Apr. 13, 1954 |
| 2,690,762 | Adams | Oct. 5, 1954 |
| 2,731,981 | Glasser | Jan. 24, 1956 |